Figure 1:
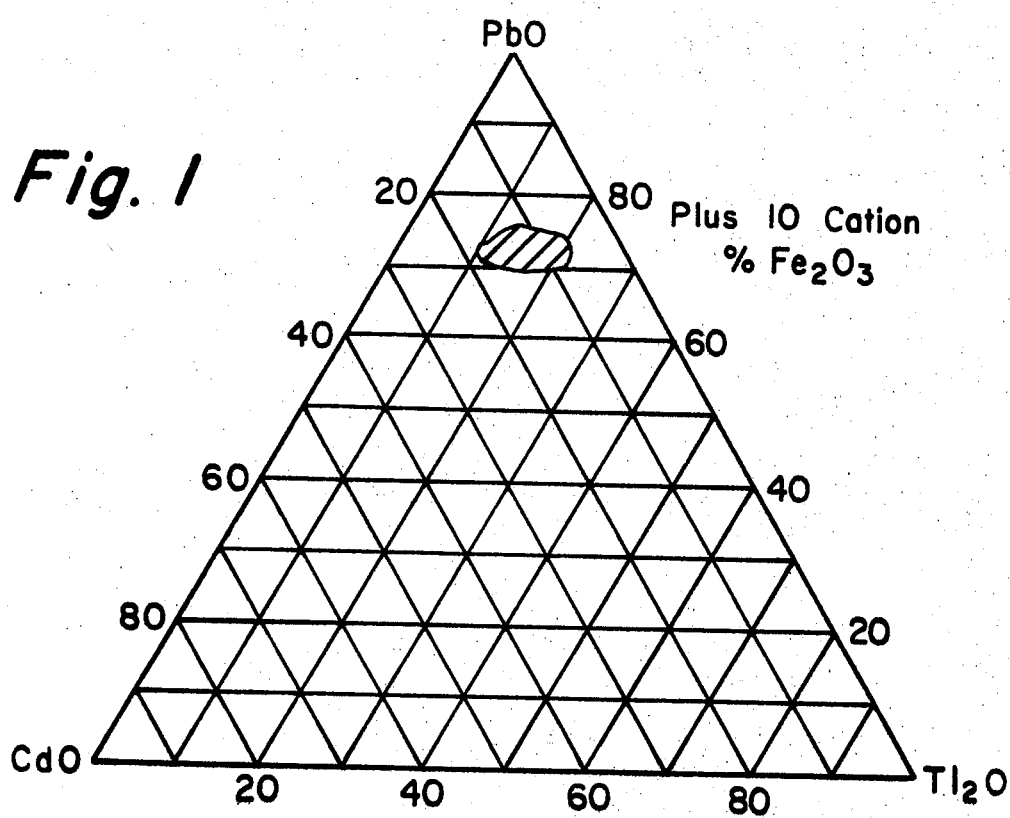

United States Patent [19]
Dumbaugh, Jr.

[11] 3,837,867
[45] Sept. 24, 1974

[54] PbO-CdO-Tl$_2$O-Fe$_2$O$_3$ GLASSES

[75] Inventor: William H. Dumbaugh, Jr., Painted Post, N.Y.

[73] Assignee: Corning Glass Works, Corning, N.Y.

[22] Filed: Mar. 26, 1973

[21] Appl. No.: 345,082

[52] U.S. Cl. .............................................. 106/47 R
[51] Int. Cl. ......... C03c 3/12, C03c 3/24, C03c 3/30
[58] Field of Search ........................ 106/47 R, 47 Q

[56] References Cited
UNITED STATES PATENTS
3,723,141  3/1973  Dumbaugh, Jr. .................. 106/47 R Primary Examiner—Winston A. Douglas
Assistant Examiner—Mark Bell
Attorney, Agent, or Firm—Clinton S. Janes, Jr.; Clarence R. Patty, Jr.

[57] ABSTRACT

A new system of glasses is composed essentially of 33–68 cation percent PbO, 2.5–27 cation percent CdO, 10–30 cation percent Fe$_2$O$_3$, and 4–28 cation percent Tl$_2$O. The glasses are low-melting, have extremely high densities and refractive indices, and have excellent infrared transmission characteristics.

4 Claims, 6 Drawing Figures

$PbO$-$CdO$-$Tl_2O$-$Fe_2O_3$ GLASSES

Lead glasses characteristically have relatively low melting temperatures, high refractive indices and densities, and good electrical properties. Accordingly, this type glass has found widespread use for such diverse purposes as sealing glasses, optical products, and electrical enclosures. However, the infrared transmission characteristics of such glasses are generally insignificant and of no particular interest because they normally contain silica or boric oxide as a glassforming oxide.

Special glasses (e.g., calcium aluminosilicate and aluminogermanate glasses) have been developed and used to produce infrared transmitting products such as the windows in heat detection systems. However, these glasses have a characteristic transmission cutoff in the range of 4.5 to 5.5 microns, and do not transmit radiation of a wavelength longer than about 6 microns.

My pending application, Ser. No. 126,798 filed Mar., 22, 1971, now U.S. Pat. No. 3,723,141 granted Mar. 27, 1973, describes lead bismuthate glasses which are stabilized with oxides of barium ($BaO$) and zinc ($ZnO$) and are capable of transmitting infrared radiation of wavelength greater than 6 microns. A companion application, Ser. No. 345,083 filed of even date herewith in the names of A. J. Berleue and myself, discloses and claims lead and/or cadmium bismuthate glasses stabilized with iron oxide. These glasses also have particularly good infrared transmission characteristics in addition to high refractive indices and useful electrical properties.

It is the basic purpose of the present invention to provide a novel glass system or family, the $PbO$-$Tl_2O$-$CdO$-$Fe_2O_3$ system, which is unusual in that it does not require a conventional glass-forming oxide such as silica or boric oxide. The new glasses have the usual characteristics of lead glasses in that they melt at relatively low temperatures, have extremely high densities and refractive indices, and have useful electrical properties. However, they are of particular interest because they additionally have excellent infrared transmission characteristics.

My invention is a glass consisting essentially, on the oxide basis, of 33 to 68 cation percent $PbO$, 2.5 to 27 cation percent $CdO$, 10 to 30 cation percent $Fe_2O_3$, and 4 to 28 cation percent $Tl_2O$.

As illustrated subsequently, glasses may be produced in the present system with lead oxide contents ranging from 33 to 68 cation percent. The lead oxide component is primarily responsible for the excellent electrical and optical properties of the present glasses, as well as their relatively low melting temperatures. It is also an essential basis for the good infrared transmission characteristics. Prior lead glasses have had a high infrared transmission potential, but have generally required a substantial amount of $B_2O_3$ or $SiO_2$ as a glass former. These oxides drastically degrade the infrared transmission and rob the glass of utility for such applications.

The key oxide in forming the present glasses is iron oxide ($Fe_2O_3$). This oxide is not normally considered to be a glass forming oxide, but I have found that it does have a strong stabilizing influence on lead oxide, thereby providing the glasses of the present invention. More important, while it does absorb to some extent in the near infrared (one to two micron wavelength range), it does not appreciably degrade transmission in the area of interest, i.e., beyond two microns.

Cadmium oxide ($CdO$) and thallous oxide ($Tl_2O$) function primarily as modifying oxides. They serve to improve glass forming and working characteristics and to adjust physical properties such as expansion and viscosity without seriously degrading infrared transmission. At least 2.5 cation percent $CdO$, and at least 4 cation percent $Tl_2O$ are required in the present glass compositions.

In general, the basic properties of the present glasses are not enhanced by oxides other than the four oxides already mentioned. Further, such other oxides may render the glasses more difficult to work, or may tend to diminish the infrared transmitting potential. Therefore, it is preferable to limit the glasses to essentially the four oxides mentioned. However, it may be necessary to employ minor amounts of other oxides for such purposes as fining, coloring, and viscosity adjustment. These optional constituents include $MoO_3$, $HgO$ and $GeO_2$, as well as the known fining agents, colorants, and flux oxides. Up to 10 cation percent of such oxides, collectively or individually, may be added without seriously affecting the key properties of the base glass. In some instances, it is also possible to employ $SiO_2$ and/or $B_2O_3$ in amounts up to 5 cation percent. However, these oxides usually should not exceed about 2 cation percent collectively because of their serious effect on infrared transmission.

Figure 6:
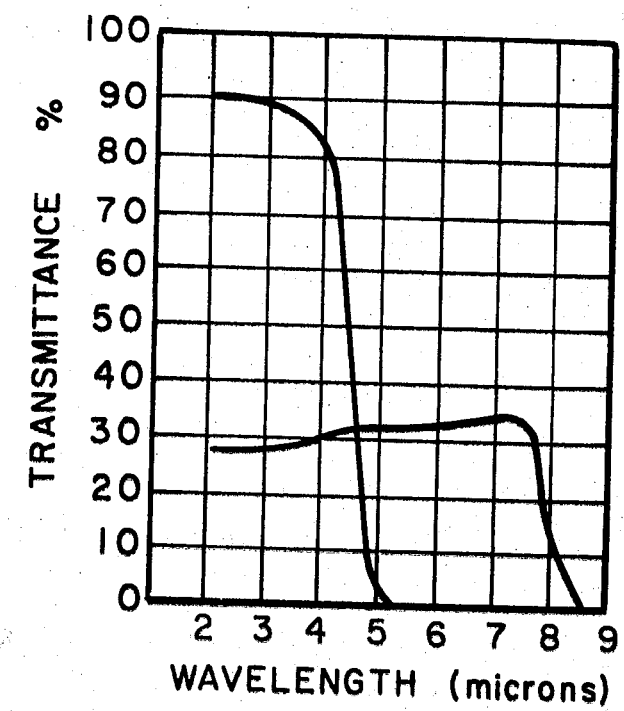

The invention is further illustrated in, and described with reference to, the accompanying drawings wherein, FIGS. 1 through 5 are ternary composition diagrams illustrating glass forming capabilities in the new glass system at different iron oxide levels, and FIG. 6 is a graphical illustration comparing the infrared transmission characteristics of a glass in accordance with the present invention and a prior commercial glass.

FIG. 1 is a ternary composition diagram, that is a triangular graphical illustration, wherein the left-hand end of the base represents 100% $CdO$, the right-hand end represents 100% $Tl_2O$ and the peak or vertex of the triangle represents 100% $PbO$. In all of the glasses plotted in this diagram there is an added iron oxide ($Fe_2O_3$) content of 10 cation percent. The enclosed area in the upper part of the diagram represents that portion of the entire composition area of the new system in which glasses could be formed with a 10 percent iron oxide addition.

FIGS. 2 through 5 are ternary diagrams corresponding to FIG. 1, but representing glass forming regions in the composition system with iron oxide additions of 15, 20, 25 and 30 cation percent, respectively.

The glass forming region, as illustratively shown in FIGS. 1–5, was explored using a technique known as strip melting. In this technique, a glass batch is formulated and mixed in the usual manner. Approximately 5 grams of batch is placed in a depression formed in a strip of thin platinum foil. The platinum melting strip is mounted with an electrode fastened to either end. Then a variable, controlled source of electrical power is supplied to gradually heat the strip to a predetermined melting temperature. After the batch is completely melted, the temperature is maintained for about two minutes. Then the power is discontinued and a jet of cooling air directed against the bottom of the platinum strip directly beneath the melted batch to quench the melt.

Figure 2:
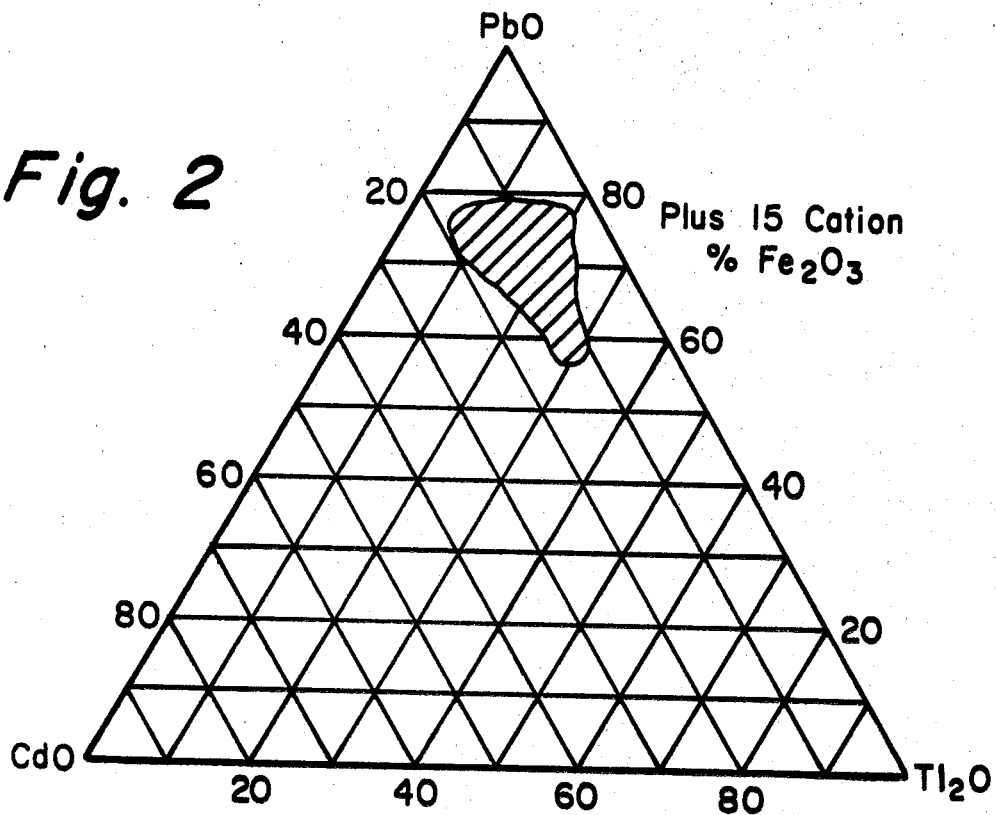
Figure 3:
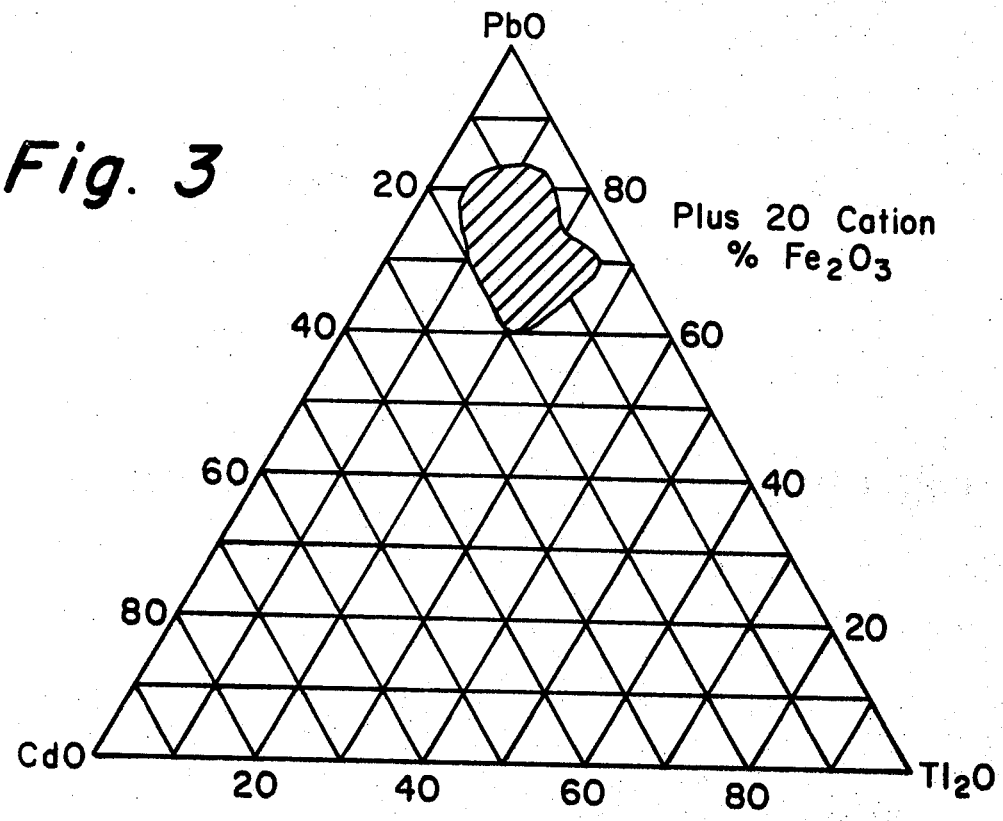
Figure 4:
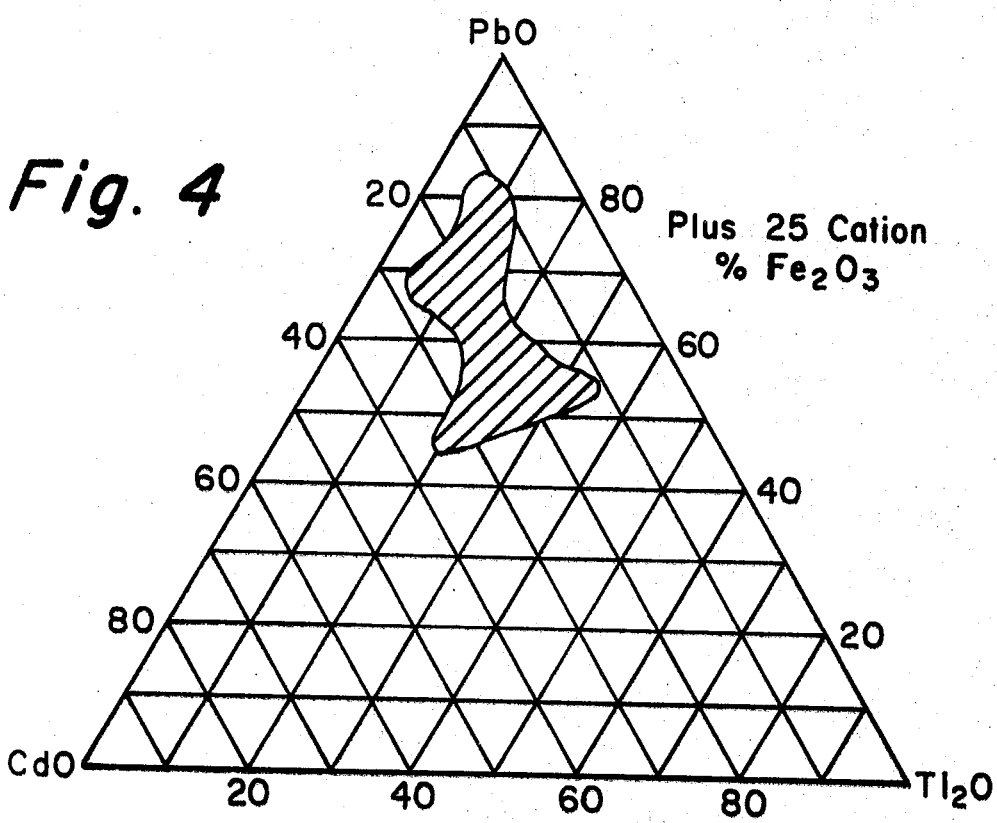
Figure 5:
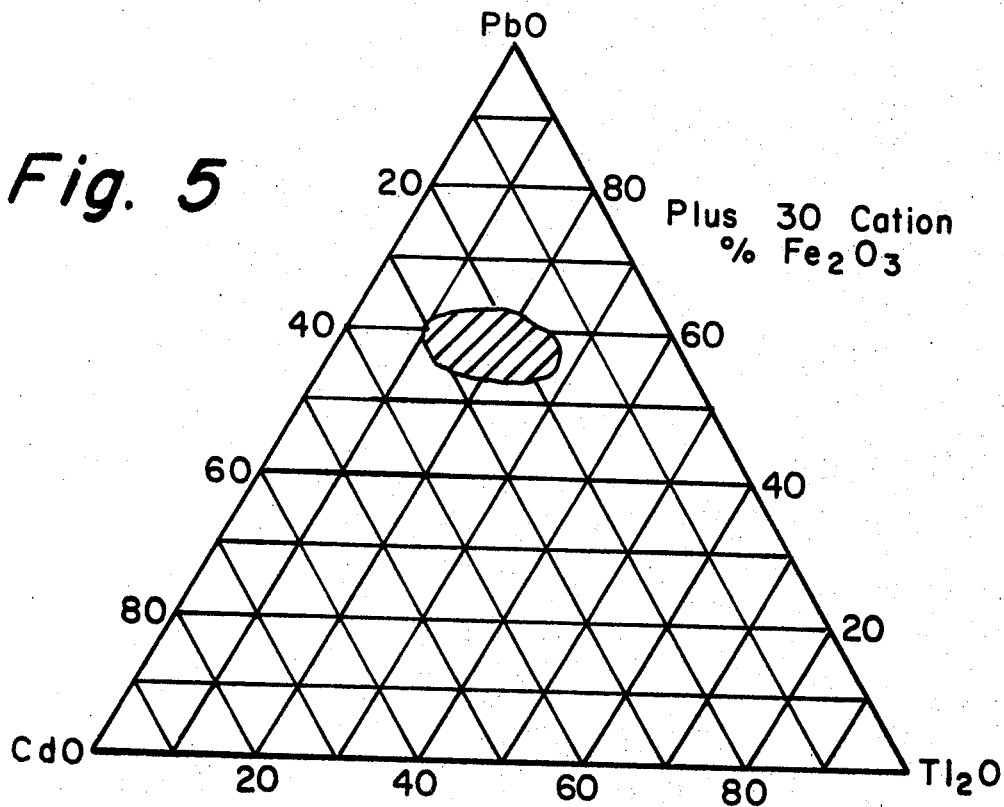

By way of more specifically illustrating the systematic exploration of the glass forming area, reference is made to FIG. 2. A batch composed, on a cationic basis, of 70 parts lead oxide, 10 parts cadmium oxide, and 20 parts thallous oxide was mixed and an addition of 15 parts ferric oxide made. Additional batches were formulated and mixed in which the iron and cadmium oxides were held constant and lead oxide and thallous oxide substituted for one another over the range of 55 to 80 parts lead oxide and 10 to 35 parts thallous oxide. A further series of batches at the 15 percent cadmium oxide level were formulated and weighed. A sample of each batch was then heated on the strip melter and chilled to determine whether glass formation took place. This method of systematic oxide substitution was used to determine the field of glass formation outlined in each of FIGS. 1–5.

Glass batches are normally formulated on a weight basis, and oxide compositions are then calculated therefrom on a weight percent basis. Nevertheless, it is frequently desirable to express compositions in terms of ions or moles to better demonstrate a relationship between a series of glass compositions and their properties. Further, substitutions between additives such as alkali metal oxides, radiation absorbers, and fining agents must often be made on an ionic or mole basis to avoid complications arising from the great disparity in atomic weights of the cationic elements. Mole percent is commonly used, but cation percent is preferable where cations of multiple valence are involved, e.g., iron, molybdenum, germanium, and tantalum.

Cation percent represents a relationship between the actual numbers of cations in a composition. Thus, a composition consisting, on a cation basis, of 40 percent lead oxide (PbO), 20 percent cadmium oxide (CdO) and 40 percent thallous oxide ($Tl_2O$) will contain cations in the ratio of 4 lead: 2 cadmium: 4 thallium. In turn, this corresponds to a ratio of 4 moles PbO: 2 moles CdO: 2 moles $Tl_2O$ (4 thallium ions). It is then an arithmetic process to convert any given cation percent composition to weight percent.

Accordingly, the present glasses are defined in terms of cation percent. However, subsequent specific examples are given in both cation and weight percent as a matter of convenience. Further, the cation percent ranges, previously expressed in the statement of invention, correspond approximately to the following weight percent ranges: 40–80% PbO, 4–35% $Tl_2O$, 2–22% CdO and 4–15% $Fe_2O_3$.

The present glasses melt at temperatures in the range of 900° to 1,000°C. Reagent grade oxides are usually used as batch constituents in the interest of purity and property control. For the same reasons, it is generally desirable to melt the glasses in electrically heated platinum containers. However, other raw materials and melting units may be used if glass purity is less critical.

The glass melt is usually chilled rapidly from the molten state to guard against devitrification. Subject to this precaution, the glass may be cast in desired shape, ground and polished for optical purposes, or finished in other manner if optics are not of primary concern.

It will be understood that glasses near the composition boundaries shown in the drawings have a strong tendency to devitrify, and therefore are difficult to melt and handle in larger melts. Accordingly, I prefer glasses having compositions within the ranges 50–65 cation percent PbO, 7.5–12.5 cation percent CdO, 9.5–15 cation percent thallous oxide and 10–20 cation percent iron oxide because of their greater stability. Within these preferred ranges, several compositions were selected for melting on larger scale and measurement of certain physical and/or optical characteristics.

Table I below sets forth, by way of example, the batches from which several of these glasses were melted. These batch compositions are set forth in parts by weight on an oxide basis. It will be appreciated that, since the batches are composed of oxides, glasses melted therefrom have the same calculated composition in percent by weight, and approximately the same analyzed composition.

Table I

|  | 1 | 2 | 3 | 4 | 5 | 6 |
|---|---|---|---|---|---|---|
| PbO | 55.7 | 66.9 | 73.4 | 70.1 | 71.6 | 73.0 |
| $Tl_2O$ | 13.3 | 17.4 | 16.1 | 11.1 | 11.4 | 11.5 |
| CdO | 16.0 | 7.0 | 6.5 | 6.7 | 6.9 | 7.0 |
| $Fe_2O_3$ | 15.0 | 8.7 | 4.0 | 8.3 | 8.5 | 6.7 |
| $MoO_3$ | — | — | — | 3.8 | — | — |
| $SiO_2$ | — | — | — | — | 1.6 | — |

Table II sets forth, in cation percent, the compositions of glasses melted from the batches of Table I. It also presents annealing point (A.P.), crystallization temperature (C.T.), and melting point or liquidus (M.P.) data in degrees centigrade (°C.) as estimated for each glass from a differential thermal analysis carried out on the glass. The density of each glass is also shown in grams per cubic centimeter (g/cc).

Table II

|  | Cation % | | | | | |
|---|---|---|---|---|---|---|
|  | 1 | 2 | 3 | 4 | 5 | 6 |
| PbO | 40 | 55 | 65 | 57.1 | 57.1 | 60 |
| $Tl_2O$ | 10 | 15 | 15 | 9.5 | 9.5 | 10 |
| CdO | 20 | 10 | 10 | 9.5 | 9.5 | 10 |
| $Fe_2O_3$ | 30 | 20 | 10 | 19.1 | 19.1 | 20 |
| $MoO_3$ | — | — | — | 4.8 | — | — |
| $SiO_2$ | — | — | — | — | 4.8 | — |
| A.P. | 370 | 365 | 255 | 300 | 305 | 290 |
| C.T. | — | 405 | 310 | 350 | 360 | 340 |
| M.P. | 610 | 640 | 600 | 600 | 560 | 610 |
| Den. (g/cc) | 6.30 | 6.86 | 7.90 | 7.57 | 7.43 | 7.99 |

In several cases, a disc suitable for infrared transmission measurements was cast from the glass melt. In these cases, the percent transmission was measured at several wavelengths on a Perkin Elmer Model 221 Recording Spectrophotometer. The thickness of the disc was about 0.5 mm. and the disc was unpolished because of fragility. Accordingly, the measured data is of considerably lower value than might be expected.

Table III sets forth the measured transmission data:

Table III

| Wavelength | Transmittance (%) | | | |
|---|---|---|---|---|
|  | 2 | 3 | 4 | 5 |
| 4 u | 30 | 34 | 29 | 33 |
| 6 u | 26 | 35 | 15 | 19 |
| 7 u | 34 | 30 | 31 | 27 |
| 8 u | 25 | 13 | 9 | 2 |

FIG. 6 of the drawing is a graphical illustration wherein wavelengths (in microns) are plotted along the horizontal axis and percent transmittance is plotted along the vertical axis. In the illustration, curve C records the transmission measurements made on the glass of example 2 in Tables I and II. It will be appreciated that the transmission values represented by curve C are, due to glass quality, lower than might be expected. However, the significant factor is substantial transmission at wavelengths longer than 6 microns. Curve A records the corresponding transmission characteristics of a commercial infrared transmitting glass available from Corning Glass Works under the designation Code Number 9753.

I claim:
1. A glass consisting essentially of 33 to 68 cation percent PbO, 2.5 to 27 cation percent CdO, 10 to 30 cation percent $Fe_2O_3$ and 4 to 28 cation percent $Tl_2O$.
2. A glass in accordance with claim 1 consisting essentially of 50 to 65 cation percent PbO, 7.5 to 12.5 cation percent CdO, 9.5 to 15 cation percent $Tl_2O$ and 10 to 20 cation percent $Fe_2O_3$.
3. A glass in accordance with claim 1 containing $SiO_2$ and/or $B_2O_3$ in an amount not exceeding 2 cation percent.
4. A glass in accordance with claim 1 which additionally contains up to 10 cation percent of other compatible glass forming oxides.

* * * * *